(12) United States Patent
Braun et al.

(10) Patent No.: US 11,900,387 B2
(45) Date of Patent: Feb. 13, 2024

(54) MONITORING ACCOUNT USAGE TO PROVIDE TRANSACTION RETRY NOTIFICATIONS

(71) Applicant: MASTERCARD INTERNATIONAL INCORPORATED, Purchase, NY (US)

(72) Inventors: Lisa-Marie Braun, New Rochelle, NY (US); Zachary Nusbaum, Long Island City, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 105 days.

(21) Appl. No.: 17/075,090

(22) Filed: Oct. 20, 2020

(65) Prior Publication Data

US 2022/0122076 A1    Apr. 21, 2022

(51) Int. Cl.
| | |
|---|---|
| *G06Q 40/02* | (2023.01) |
| *G06Q 20/40* | (2012.01) |
| *G06Q 20/08* | (2012.01) |
| *G06N 20/00* | (2019.01) |
| *G06Q 20/12* | (2012.01) |
| *G06Q 20/02* | (2012.01) |

(52) U.S. Cl.
CPC .......... *G06Q 20/405* (2013.01); *G06N 20/00* (2019.01); *G06Q 20/02* (2013.01); *G06Q 20/085* (2013.01); *G06Q 20/127* (2013.01); *G06Q 20/4037* (2013.01); *G06Q 40/02* (2013.01)

(58) Field of Classification Search
None
See application file for complete search history.

(56) References Cited

U.S. PATENT DOCUMENTS

| | | | |
|---|---|---|---|
| 9,378,492 B1* | 6/2016 | Cole | G06Q 20/405 |
| 10,373,168 B2* | 8/2019 | Blinov | G06Q 20/4093 |
| 10,839,394 B2* | 11/2020 | Jia | G06N 20/00 |
| 2018/0239561 A1* | 8/2018 | Nuggehalli | G06Q 20/145 |
| 2019/0114645 A1* | 4/2019 | Gaitanos | G06Q 20/4012 |
| 2020/0327552 A1* | 10/2020 | Seshan | G06F 11/1405 |

* cited by examiner

*Primary Examiner* — David P Sharvin
(74) *Attorney, Agent, or Firm* — Barta Jones, PLLC (57) ABSTRACT

The disclosure herein describes providing transaction retry notifications to merchants based on monitored account usage. An insufficient funds message of a first transaction is received that indicates the first transaction includes a payment to be provided to a merchant from an account and that the account has insufficient funds for the first transaction. An account identifier of the account is stored and a transaction message of a second transaction associated with the account is detected based on the stored account identifier. The transaction message indicates that the account has sufficient funds for the second transaction. Based on detecting the transaction message, a transaction retry notification is sent to the merchant, whereby the merchant is notified that the account with which the first transaction is associated includes a quantity of funds. The disclosure enables merchants to optimize the timing or retrying failed transactions and thereby reduce costs associated with transaction retries.

20 Claims, 5 Drawing Sheets

MONITORING ACCOUNT USAGE TO PROVIDE TRANSACTION RETRY NOTIFICATIONS

BACKGROUND

In the modern payment landscape, some payments to merchants fail due to the payer account having insufficient funds to complete the transaction. In response to such failures, merchants may attempt to retry the transaction several times, hoping that the payer account will have sufficient funds, particularly if the failed transaction is a recurring transaction or an otherwise scheduled transaction. For merchants that rely on recurring transactions, the fees and resource requirements associated with retrying failed transactions can add up to substantial costs. Thus, identifying ways to efficiently perform transaction retries presents a significant challenge to such merchants.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for providing transaction retry notifications is described. An insufficient funds message of a first transaction is received by a processor, wherein the insufficient funds message indicates that the first transaction includes a payment to be provided to a merchant from an account and that the account has insufficient funds to provide the payment to the merchant. An account identifier of the account associated with the first transaction is stored in a monitored account identifier data set. A transaction message of a second transaction associated with the account is detected based on the stored account identifier in the monitored account identifier data set, wherein the transaction message indicates that the account has sufficient funds for the second transaction. Based on detecting the transaction message, a transaction retry notification is sent to the merchant, whereby the merchant is notified to retry the first transaction.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 5, the systems are illustrated as schematic drawings. The drawings may not be to scale.

DETAILED DESCRIPTION

Aspects of the disclosure provide a computerized method and system for providing transaction retry notifications based on monitored account usage. An insufficient funds message of a first transaction is received that indicates that the first transaction includes a payment from an account to a merchant and the account has insufficient funds for the payment. An account identifier of the account is stored in a monitored account identifier data set. Later, a transaction message of a second transaction that is associated with the account is detected based on the stored account identifier. The transaction message of the second transaction indicates that the account has sufficient funds for the second transaction. Based on detecting the transaction message, a transaction retry notification is provided to the merchant, whereby the merchant is notified to retry the first transaction.

The disclosure addresses the challenges of monitoring usage of accounts associated with transactions that have failed and determining when associated retries of transactions are likely to be successful. Further, merchants may be provided with multiple dates and/or times at which retries of transactions are likely to be successful. The disclosure operates in an unconventional way at least by monitoring the usage of accounts from the perspective of a payment network facilitating transactions, such that merchants associated with failed transactions benefit from the payment network's access to transaction data that the merchants would otherwise not be able to leverage. Further, the determination of confidence factors that indicate a predicted likelihood of successful retries is based on an account usage model that is trained over time using machine learning, such that the accuracy of calculated confidence factors and the associated transaction retry notifications increases over time as more and more transaction retry notifications are generated and shared with merchants. The use of the described system to optimize transaction retry timing for merchants improves the efficiency and accuracy of merchants' computing devices that schedule and/or perform associated transaction retries, such that transaction retries that fail again are performed less frequently and transaction retries that succeed are performed more frequently, saving on fees associated with the retries, reducing processing usage and/or other resource usage for the retries, and improving customer service associated with interactions between the merchants and the payment network providing the described service.

Figure 1:
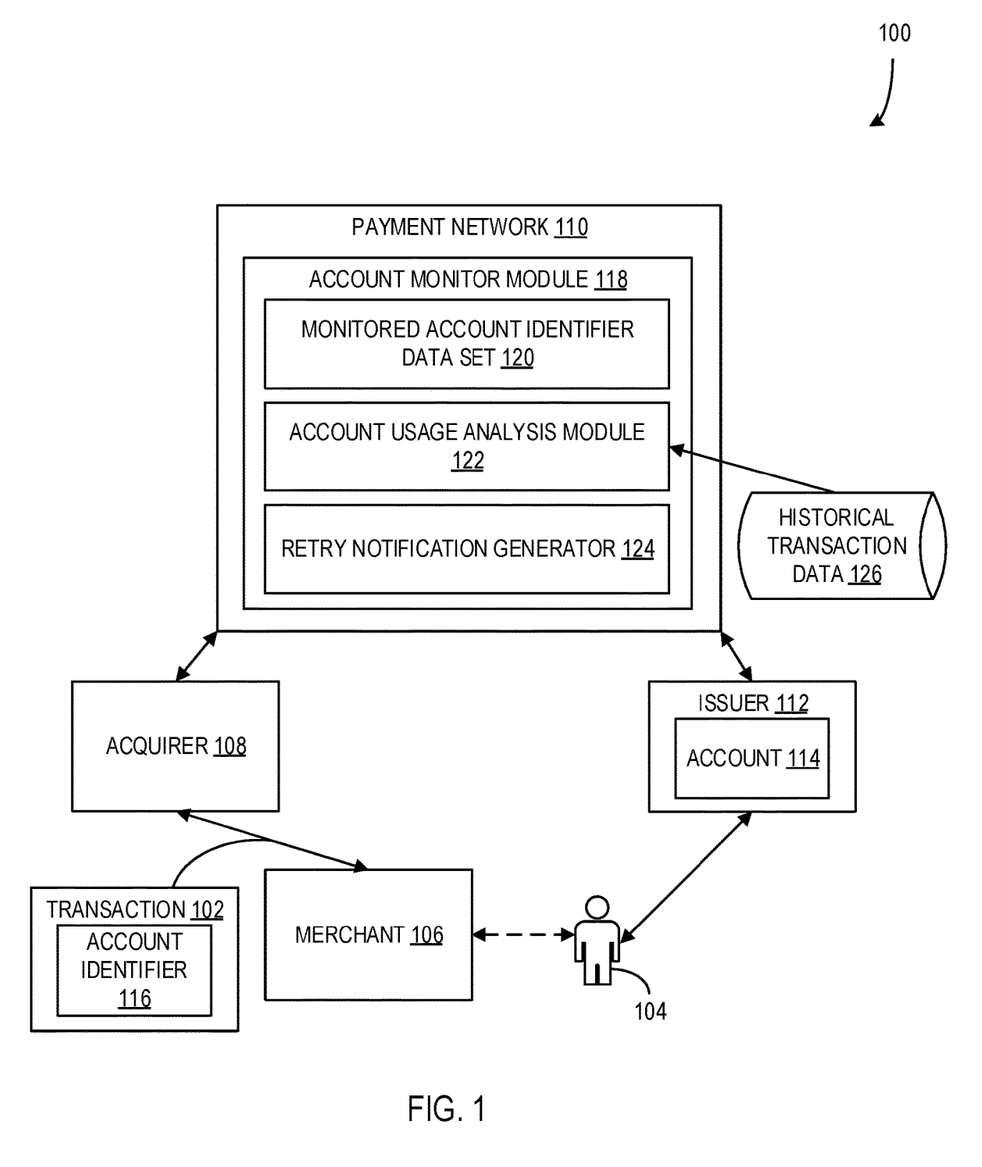
FIG. 1 is a block diagram illustrating a system configured for monitoring account usage and sending transaction retry notifications based on monitored account usage according to an embodiment.

FIG. 1 is a block diagram illustrating a system 100 configured for monitoring account usage and sending transaction retry notifications based on monitored account usage according to an embodiment. The system 100 is configured to enable transaction 102 to be initiated from a user, or customer, 104 to a merchant 106 (illustrated by the dotted line between the user 104 and the merchant 106). The transaction 102 is processed electronically by the acquirer 108 associated with the merchant 106, the payment network 110, and the issuer 112 associated with the user 104, as illustrated by the lines between these entities in FIG. 1. In some examples, the acquirer 108 and issuer 112 are banks or other financial institutions that store and/or manage financial accounts (e.g., checking accounts, savings accounts, credit-based accounts, etc.). The acquirer 108 manages a financial account of the merchant 106 and the issuer 112 manages an account 114 of the user 104.

The payment network 110 (e.g., MASTERCARD) is an entity configured to facilitate the processing of the transaction 102, including the transfer of transaction data and a payment associated with the transaction 102 from the merchant 106's account held by the acquirer 108 to the user 104's account 114 held by the issuer 112. In some examples, such facilitating by the payment network 110 includes at least facilitating the authorization of the transaction by the issuer 112, facilitating the authentication of the user 104's identity and account details and providing the acquirer 108 and merchant 106 with an associated confirmation or rejection, and facilitating clearing and settling of transactions, including transaction 102, between the acquirer 108 and issuer 112. It should be understood that the payment network 110 may be configured to provide such functionality and/or other transaction processing functionality in any manner without departing from the description herein.

The transaction data of transaction 102, including the account identifier 116 associated with the user's account 114, is sent from the merchant 106 to the acquirer 108 and then, from the acquirer 108 to the payment network 110. The payment network 110 may be configured to store transaction data of the transaction 102 in the historical transaction data 126 data store. Further, reply messages from the issuer 112 associated with the transaction 102 are also sent to the payment network 110 and on to the acquirer 108. For instance, if the issuer 112 authorizes and authenticates the transaction 102, the issuer 112 may send a confirmation message associated with the transaction 102 to the payment network 110 to be forwarded, at least in part, to the acquirer 108. In other examples, the transaction 102 may not be authorized and/or authenticated by the issuer 112, and the issuer 112 may be configured to send a rejection message to the acquirer 108 via the payment network 110 as a result (e.g., if the account 114 has insufficient funds to pay the merchant 106 for the transaction, the issuer 112 may send a message indicating that the transaction 102 is rejected or otherwise halted due to insufficient funds). Thus, the payment network 110 is configured to receive, interact with, and/or forward transaction data and other messages associated with processing transaction 102 between the user 104 and merchant 106, as well as other transactions between other parties (e.g., transactions between the user 104 and other merchants).

In some examples, when transaction 102 is rejected for the user 104 having insufficient funds in the account 114, the merchant 106 attempts to retry the transaction 102 later in the interest of completing it. The merchant 106 may attempt to retry a transaction 102 several times before considering it a failed transaction, and each time, the merchant 106 sends instructions to the acquirer 108 to retry the transaction 102, which results in another attempt to process and complete the transaction 102. If the transaction 102 is successfully processed at this time (e.g., the account 114 now has sufficient funds for the transaction 102), the merchant 106 stops retrying the transaction, but if it is still rejected (e.g., the account 114 still has insufficient funds), the merchant 106 may schedule another retry for later. In some examples, each time the merchant 106 initiates a retry of a transaction, the merchant 106 has to pay a fee and/or other costs for the transaction processing services provided by the acquirer 108, payment network 110, and/or issuer 112, so the merchant 106 may attempt to schedule retries on rejected transactions in such a way as to minimize fee payment and/or maximize the chance that the transaction will be successful.

The payment network 110 includes an account monitor module 118, which includes hardware, firmware, and/or software configured for monitoring account usage of the account 114 and/or other accounts and providing transaction retry notifications to merchant 106 and/or other merchants. The account monitor module 118 includes a monitored account identifier data set 120, an account usage analysis module 122, and a retry notification generator 124. The monitored account identifier data set 120 is configured to store account identifiers (e.g., primary account numbers (PANs), other types of account numbers, and/or other combinations of data values that constitute identifiers of accounts) of accounts that the account monitor module 118 is currently monitoring. In some examples, the monitored account identifier data set 120 further includes one or more merchant identifiers and/or transaction identifiers mapped to or otherwise associated with the account identifiers. The merchant identifier(s) associated with a particular account identifier are used to identify target merchants for transaction retry notifications based on detecting transactions associated with that account identifier (e.g., the account identifier 116 of the account 114 is stored in association with a merchant identifier of the merchant 106 such that, when a retry notification is generated in association with the account 114, it is sent to the merchant 106).

The account monitor module 118 is configured to monitor transaction data of transactions received by the payment network 110 during processing of those transactions and to identify transactions that are associated with the account identifiers in the monitored account identifier data set 120. Upon identifying a transaction associated with one of the monitored account identifiers, the account monitor module 118 is configured to determine whether to generate a retry notification via the retry notification generator 124 and send it to a merchant.

In some examples, to make that determination, the account usage analysis module 122 is configured to analyze transaction data of the identified transaction as well as historical transaction data 126 that is associated with the account 114. The account usage analysis module 122 may be configured to generate a confidence factor that a retry attempt by the merchant 106 will be successful, wherein the confidence factor is calculated based, at least in part, on analysis of transaction data associated with the account 114. The functionality and operations of the account usage analysis module 122 are described in greater detail below with respect to the account usage analysis module 222 of FIG. 2.

Further, the retry notification generator 124 is configured to generate retry notifications to be sent to merchant 106 to help merchant 106 determine when to initiate a retry attempt with respect to transaction 102 when the transaction has failed due to insufficient funds in the account 114. The generation of retry notifications may include determining to which merchants the notifications are to be sent and what date and/or time to recommend the merchants attempt retries of transactions. In some examples, retry notifications indicate that the merchant receiving the notification should attempt a retry of the associated transaction immediately upon receipt. Alternatively, or additionally, a retry notification may include multiple dates, times, and/or schedules indicating recommended times to attempt retries. The functionality and operations of the retry notification generator 124 are described in greater detail below with respect to the retry notification generator 224 of FIG. 2.

In some examples, the account monitor module 118 of the payment network 110 is configured to enable merchant 106 and/or other merchants to access and/or interact with the account monitor module 118 via an exposed application program interface (API). Such an API is configured to enable merchants that are making use of the account monitoring services provided to provide account identifiers to be monitored, provide specific or custom settings regarding when the account monitor module should provide retry notifications (e.g., merchant 106 sets a custom setting such that the account monitor module 118 sends retry notifications only when the associated confidence factor is above a defined threshold value), provide feedback based on results of attempted retries that are performed in response to retry notifications, and/or other types of interactions. Further, the API may be configured to enable merchants to subscribe to the API, such that they receive the retry notifications via the API.

It should be understood that, while the description primarily focuses on rejections of transactions based on insufficient funds in a payer's account, other types of transactions may also cause accounts to be monitored and/or retry notifications to be sent without departing from the description herein.

Figure 2:
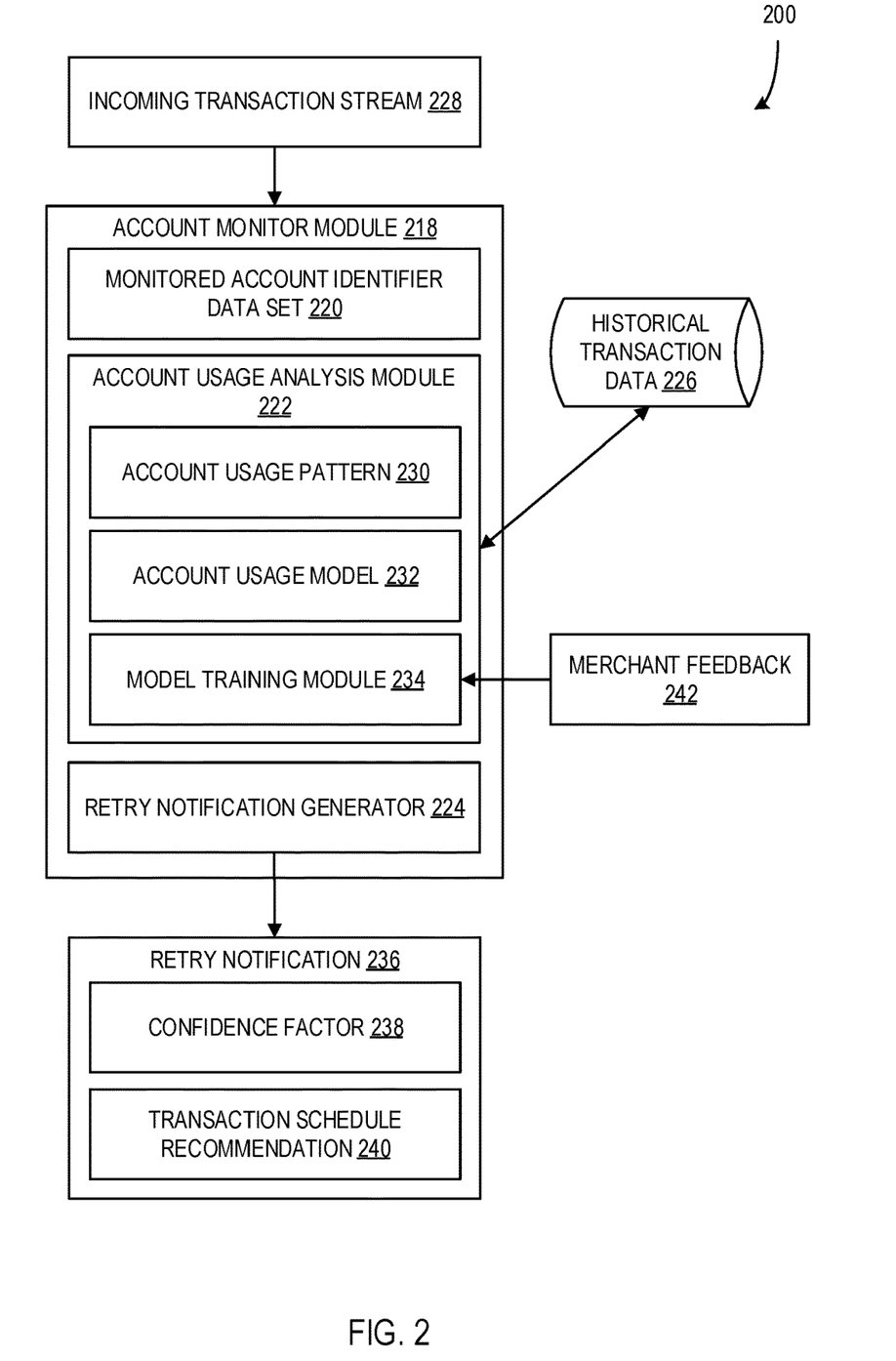
FIG. 2 is a block diagram illustrating a system configured for monitoring account usage based on an incoming transaction stream and generating transaction retry notifications based on an associated account usage pattern according to an embodiment.

FIG. 2 is a block diagram illustrating a system 200 configured for monitoring account usage based on an incoming transaction stream 228 and generating retry notifications 236 based on an associated account usage pattern 230 according to an embodiment. In some examples, the system 200 is a subsystem of the system 100 of FIG. 1, such that the account monitor module 218 is a component of the payment network 110.

As described above with respect to the account monitor module 118 in FIG. 1, the account monitor module 218 is configured to store account identifiers in the monitored account identifier data set 220 and monitor transaction activity of the accounts associated with the account identifiers (e.g., detecting when monitored transactions fail due to insufficient funds and/or when transactions are successful). The account identifiers of the data set 220 are compared against the account identifiers of transactions in the incoming transaction stream 228 and, when an account identifier of a transaction in the stream 228 matches an account identifier in the data set 220, the account monitor module 218 is configured to use the transaction data associated with the transaction as described herein (e.g., detecting the transaction is successful following a previous transaction that failed due to insufficient funds may trigger the generation of a retry notification to be sent to the merchant associated with the failed transaction).

It should be understood that the incoming transaction stream 228 is a stream of transactions that are provided to a payment network or other entity, of which the account monitor module 218 is a component, for processing. In some examples, the payment network with which the account monitor module 218 is associated passes transaction data of the transactions that the payment network facilitates to the account monitor module 218 in the form of the incoming transaction stream 228 such that the account monitor module 218 is enabled to monitor transactions associated with accounts that are being monitored (e.g., accounts associated with account identifiers in the monitored account identifier data set 220).

The account usage analysis module 222, as illustrated, includes an account usage pattern 230, an account usage model 232, and a model training module 234. Further, the account usage analysis module 222 includes hardware, firmware, and/or software configured to generate account usage patterns 230 associated with accounts based on historical transaction data 226 associated with the accounts and/or based on transaction data from the incoming transaction stream 228 associated with the accounts. In some examples, the account usage pattern 230 for an account includes and/or is based on transaction data from past transactions of the account, such as transaction date and time data, transaction amount data, and/or transaction status data, such as indicators of the success or failure of the transaction, indicators of reasons for transaction failure, and/or indicators of whether a transaction has been retried and dates and/or times of those retries. The account usage analysis module 222 may analyze such transaction data to identify one or more patterns and include the patterns in the account usage pattern 230. For instance, a pattern included in the account usage pattern 230 may indicate that transactions that have failed due to insufficient funds are usually followed by successful transactions two days later. Other patterns to be included in the account usage pattern 230 may include patterns based on amounts spent in past failed and/or successful transactions, dates of failed and/or successful transactions with respect to the current month or other time period (e.g., patterns indicating probable times the account receives deposits each month or within a two-week period), or other types of patterns.

The account usage model 232 is a model configured to be applied to the account usage pattern 230 of an account and, as a result, generate at least one of a confidence factor 238 or a transaction schedule recommendation 240 for use in a retry notification 236 as described herein. In some examples, the account usage model 232 is generated and maintained as a trained model that is trained using machine learning techniques by the model training module 234 as described herein. Additionally, or alternatively, the account usage model 232 may include one or more model rules or expressions that are evaluated to calculate confidence factors 238 for particular future dates and/or times. The model rules are configured to use parts of the account usage pattern 230 (e.g., transaction data values, sets of related data values, or parts of patterns) as input and generate output values that, when combined with output values of the other rules of the account usage model 232, form a confidence factor 238 associated with a future date and/or time. For instance, a first model rule evaluates a length of time since a transaction failed due to insufficient funds in an account and a second model rule evaluates transaction data on or around a particular date of past months (e.g., the $27^{th}$ day of several past months) to determine a confidence factor 238 of a retry attempt being successful on an upcoming day (e.g., the $27^{th}$ day of the current month).

A confidence factor 238 generated by the account usage analysis module 222 may be a result of the multiplication, addition, and/or other method of combining output values from several model rules (e.g., a first model rule has an output value of 0.74 or 74% confidence and a second model rule has an output value of 0.6 or 60% confidence and they are combined by adding the values and dividing by two to get an average confidence factor of 0.67 or 67% confidence). Further, each model rule may be associated with a weight factor that is applied to the output value of the model rule to strengthen or weaken its effect on a resulting confidence factor (e.g., the first model rule with an output value of 0.74 has a weight factor of 0.8 and the second model rule with an output value of 0.6 has a weight factor of 0.2 and they are combined by multiplying the output values by the respective weight factors and combining the results ((0.74*0.8)+ (0.6*0.2)=0.712), such that the first weight factor affects the resulting confidence factor four times as much as the second model rule).

In some examples, the account usage analysis module 222 is configured to generate a transaction schedule recommendation 240 for use in a retry notification 236 by calculating confidence factors 238 for dates and/or times in the future throughout a time period and inserting those confidence factors into the transaction schedule recommendation 240. Such a transaction schedule recommendation 240 may be configured to provide multiple options for when a retry attempt has the best chance of succeeding and/or enable the recipient of the retry notification 236 to make an informed decision on when a retry should be attempted within the time period of the transaction schedule recommendation 240. In some examples, the transaction schedule recommendation 240 includes a quantity of dates in the future (e.g., the next two weeks) and a confidence factor for each of the dates, calculated or otherwise determined as described herein. Alternatively, or additionally, the recommendation 240 includes a score and/or other indicator (e.g., icons, color-coded indications) that are associated with confidence factors for each of the dates. For instance, a confidence factor for each date may be assigned a score (e.g., a value on a scale from 1 to 5 with a 1 indicating very low confidence and a 5 indicating very high confidence) and the score may be displayed along with associated color-coding of the score (e.g., a 5 is green, a 3 is yellow, and a 1 is red) to further inform the recipient regarding when to retry a transaction.

The model training module 234 is configured to train the account usage model 232 based on feedback received, such as merchant feedback 242 (e.g., a merchant indicates whether a retry attempt was successful after a retry notification is sent). In some examples, training the account usage model 232 includes evaluating the feedback received and adjusting or otherwise changing one or more model rules in the model 232 in response. Such adjustments may include adjusting what and/or how the model rules are evaluated and/or adjusting weight factors associated with model rules to change the degree to which the rules affect generated confidence factors 238. During the training process, the account usage model 232 is altered, adjusted, or otherwise changed, such that, after training is complete, application of the account usage model 232 to an account usage pattern 230 yields confidence factors 238 and/or a transaction schedule recommendation 240 that accurately predict the results of transaction retry attempts in the future. The training of the account usage model 232 and associated adjustments made to the model rules may be based on analysis of the received feedback, identification of patterns of failed and/or successful transactions, etc. Further, in some examples, the training of the account usage model 232 and adjustment of associated model rules is performed using deep learning classification algorithms and/or other machine learning techniques.

In some examples, the model training module 234 includes a machine learning module that comprises a trained regressor such as a random decision forest, a directed acyclic graph, a support vector machine, a convolutional neural network or other neural network, or another trained regressor. Such a trained regressor may be trained using the merchant feedback 242 as feedback data. It should further be understood that the machine learning module, in some examples, operates according to machine learning principles and/or techniques known in the art without departing from the systems and/or methods described herein.

In an example, the machine learning module of the model training module 234 makes use of training data pairs when applying machine learning techniques and/or algorithms. Millions of training data pairs (or more) may be stored in a machine learning data structure. In some examples, a training data pair includes a timestamp-based feedback data value paired with an interval adjustment value. The pairing of the two values demonstrates a relationship between the feedback data value and the adjustment values that may be used by the machine learning module to determine future interval adjustments according to machine learning techniques and/or algorithms.

The retry notification generator 224 is configured to generate retry notification 236 as described above with respect to retry notification generator 124 of FIG. 1. Further, the retry notification generator 224 is configured to generate retry notifications 236 that include a confidence factor 238 and/or a transaction schedule recommendation 240. In some examples, the retry notification 236 is generated to indicate that the merchant recipient of the retry notification 236 should attempt a retry immediately upon receipt and the retry notification 236 includes a confidence factor 238 associated with the current date and/or time. Alternatively, or additionally, the retry notification 236 is generated to include a recommended date and/or time in the near future at which the merchant recipient should attempt a retry (e.g., the retry notification 236 indicates the merchant should retry the transaction on the next day). In such a case, the retry notification 236 may include a confidence factor 238 associated with the date and/or time being recommended. In other examples, the retry notification 236 provides several dates and/or times that are recommended for attempting a retry and a plurality of confidence factors 238 in the form of a transaction schedule recommendation 240.

In some examples, the retry notification generator 224 is configured to generate a retry notification 236 based on the satisfaction of a defined confidence factor requirement. For instance, a confidence factor threshold may be set at 0.75 or 75%, such that the retry notification generator 224 only generates a retry notification 236 for a merchant when a generated confidence factor 238 from the account usage analysis module 222 indicates a 75% confidence that a retry attempt by the merchant will be successful. Other requirements or triggers may also be used to determine when a retry notification 236 should be generated by the retry notification generator 224 without departing from the description herein (e.g., a retry notification may be generated after a set amount of time has elapsed since a failed transaction, a retry notification may be generated when the number of accounts being monitored for a merchant exceeds a defined threshold). In further examples, a generated retry notification 236 includes other information and/or instructions for a receiving merchant, such as a transaction amount that is likely to be successful on a retry of the transaction. For instance, in situations where the merchant is configured or otherwise enabled to retry a transaction for a partial amount (e.g., half of the original transaction amount), the retry notification generator 224 may generate a retry notification 236 that indicates a transaction amount to the merchant that is likely to result in a successful retry based on calculated confidence factors and/or account usage patterns as described herein.

Figure 3:
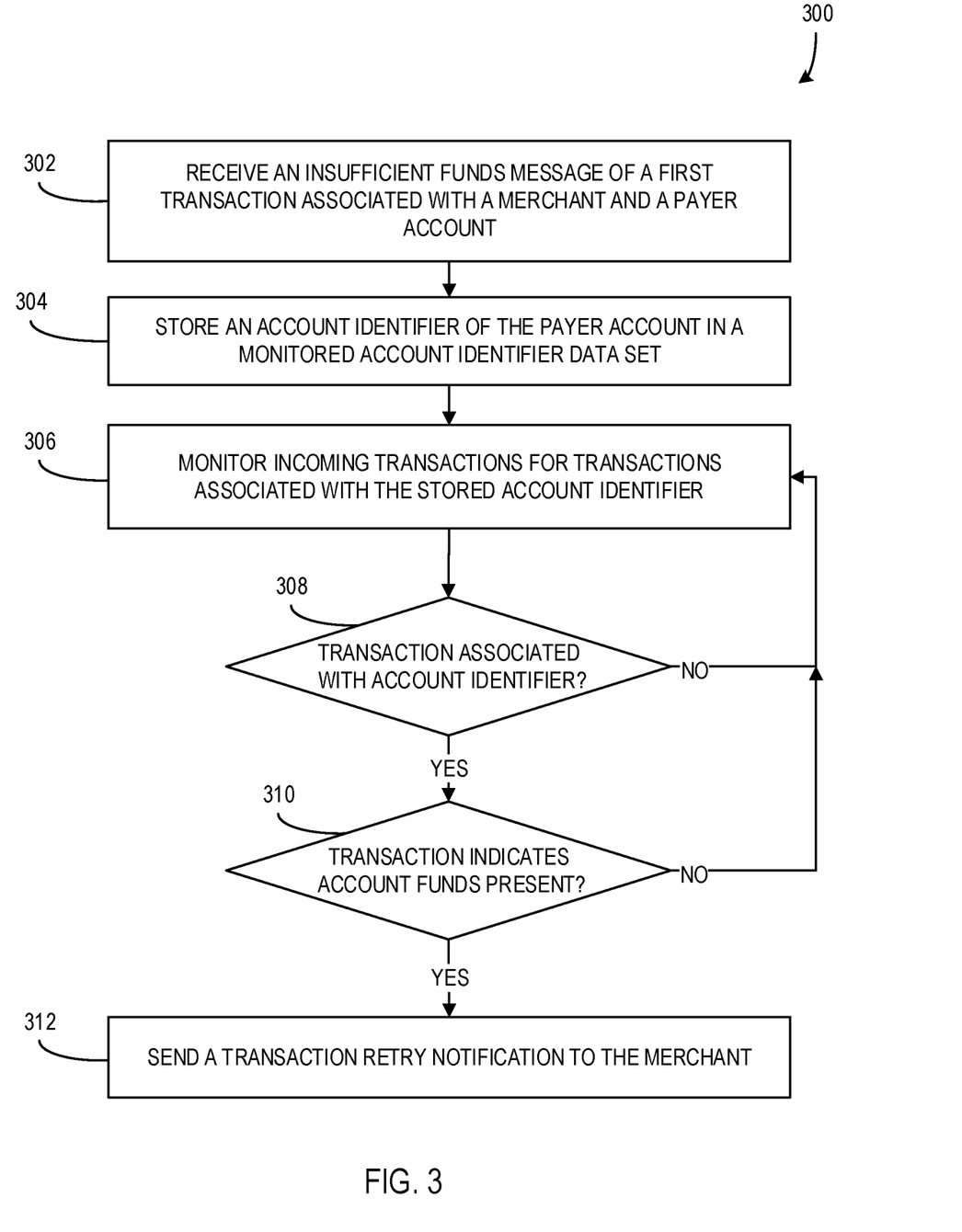
FIG. 3 is a flow chart illustrating a computerized method for monitoring account usage and sending transaction retry notifications based on the monitored account usage according to an embodiment.

FIG. 3 is a flow chart illustrating a computerized method 300 for monitoring account usage and sending transaction retry notifications (e.g., retry notification 236) based on the monitored account usage according to an embodiment. In some examples, the method 300 is implemented and/or performed by a system, such as system 100 of FIG. 1 and/or system 200 of FIG. 2, or by components thereof (e.g., the method 300 may be performed by the account monitor module 118). At 302, an insufficient funds message of a first transaction (e.g., transaction 102) is received (e.g., via the incoming transaction stream 228). The first transaction is associated with a merchant (e.g., merchant 106) and a payer account (e.g., account 114). The insufficient funds message indicates that the payer account does not have sufficient funds to complete the transaction by paying the transaction amount to the merchant.

At 304, an account identifier of the payer account is stored in a monitored account identifier data set (e.g., monitored account identifier data set 120). In some examples, the account identifier is stored in association with an identifier of the merchant and/or an identifier of the transaction. The monitored account identifier data set may include a plurality of different account identifiers and each account identifier may be associated with or otherwise linked to multiple merchant identifiers and/or transaction identifiers, such that retry notifications may be generated and sent to multiple merchants and/or with respect to multiple transactions as described herein.

At 306, incoming transactions (e.g., via the incoming transaction stream 228) are monitored for transactions associated with the stored account identifier. The incoming transactions may include transaction data as well as associated messages, such as insufficient funds messages and/or transaction messages indicating successful transactions.

If, at 308, a transaction associated with the account identifier is detected, the process proceeds to 310. Alternatively, the process returns to 306 to continue monitoring incoming transactions. If, at 310, the detected transaction (and/or associated transaction data or messages) indicates that account funds are present, the process proceeds to 312. Alternatively, the process returns to 306 to continue monitoring incoming transactions. The detected transaction and/or related information may indicate that account funds are present based on, for instance, the successful completion of a payment transaction from the account and/or any account balance information that may be included in the transaction data.

At 312, a transaction retry notification is sent to the merchant. In some examples, the transaction retry notification indicates to the merchant that an immediate retry attempt of the transaction is likely to be successful based on the detection of funds in the account. Alternatively, or additionally, the transaction retry notification may include specific date and/or time information indicating an optimized date and/or time for the merchant to attempt a retry. The optimized date and/or time is a date and/or time at which a retry attempt of a transaction is mostly likely to be successful within a time period after the failure of the original transaction. Further, the transaction retry notification may include a confidence factor and/or a transaction schedule recommendation associated with specific dates and/or times, whereby the merchant is enabled to make an informed decision regarding when to attempt a retry of the transaction.

Figure 4:
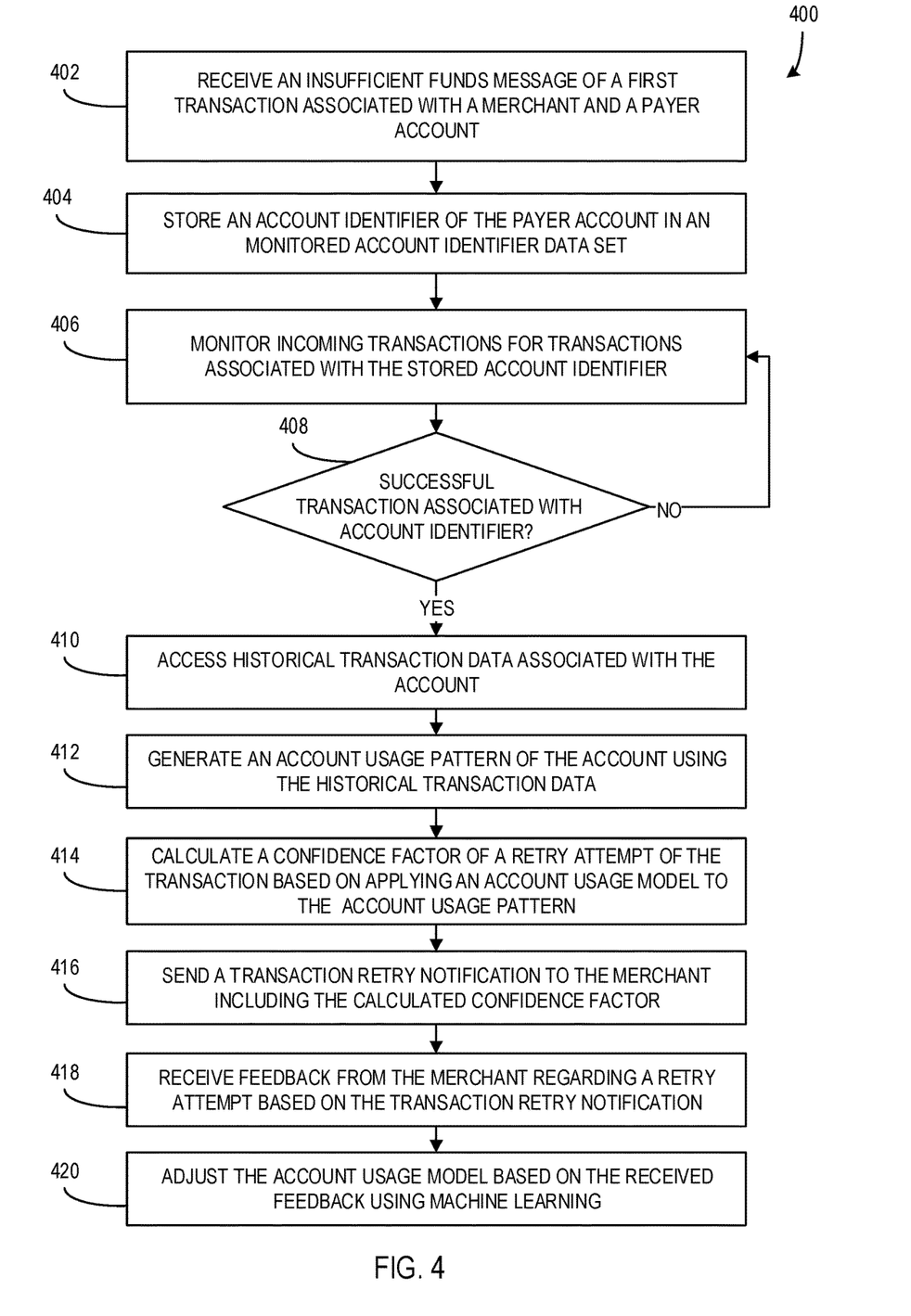
FIG. 4 is a flow chart illustrating a computerized method for sending transaction retry notifications based on application of an account usage model to an account usage pattern, including training the account usage model using machine learning, according to an embodiment.

FIG. 4 is a flow chart illustrating a computerized method 400 for sending transaction retry notifications (e.g., retry notification 236) based on application of an account usage model (e.g., account usage model 232) to an account usage pattern (e.g., account usage pattern 230), including training the account usage model using machine learning, according to an embodiment. In some examples, the method 400 is implemented and/or performed by a system, such as system 100 of FIG. 1 and/or system 200 of FIG. 2, or by components thereof (e.g., the method 400 may be performed by the account monitor module 118). At 402-406, the method 400 performs substantially the same operations as described above with respect to 302-306 of FIG. 3. At 408, if a successfully transaction associated with the account identifier is detected, the process proceeds to 410. Alternatively, the process returns to 406 to continue monitoring the incoming transactions.

At 410, historical transaction data associated with the account is accessed. In some examples, the historical transaction data is accessed from a transaction data store (e.g., historical transaction data 126, 226). The transaction data accessed may include datetime data of past transactions, status and/or result data of past transactions (e.g., whether the transactions were successful and/or reasons transactions failed), merchants involved with past transaction, or the like.

At 412, an account usage pattern is generated using the historical transaction data. In some examples, the transaction data of the transaction detected at 408 is also used in generating the account usage pattern. The generated account usage pattern may include patterns representing the occurrence of transactions that fail due to insufficient funds, transactions that are successfully completed, and/or relationships between the two types of transactions. For instance, a generated account usage pattern may indicate transactions that fail due to insufficient funds tend to occur every two weeks and successful transactions tend to follow two days after the failed transactions. Other types of patterns based on other transaction data may also be included in the generated account usage pattern without departing from the description herein.

At 414, a confidence factor of a retry attempt of the transaction is calculated based on applying an account usage model to the account usage pattern. In some examples, the confidence factor is calculated in association with a particular date and/or time, such as the current date and/or time during which the confidence factor is calculated. The account usage model may include one or more model rules that are applied to portions of the transaction data of the account usage pattern to generate output values and the confidence factor is calculated based on the generated output values as described herein. In further examples, multiple confidence factors may be calculated in association with multiple dates and/or times (e.g., separate confidence factors are calculated in association with each of the next three days, indicating a likelihood that a retry attempt on the associated day will be successful).

At 416, a transaction retry notification is generated to include the calculated confidence factor and sent to the merchant associated with the first transaction. In some examples, the transaction retry notification indicates to the merchant to immediately retry the first transaction based on the included confidence factor. Alternatively, or additionally, the transaction retry notification includes one or more confidence factors for future dates and/or times, enabling the merchant to select a date and/or time at which to retry the first transaction based on the included confidence factors. Further, the generation of the retry notification may be based on the confidence factor meeting or exceeding a defined confidence threshold (e.g., a retry notification may be generated and sent only when the calculated confidence factor meets or exceeds 80%).

At 418, feedback is received from the merchant regarding a retry attempt the merchant made based on the transaction retry notification. In some examples, the merchant feedback includes an indication of whether the retry attempt succeeded or failed again due to insufficient funds. At 420, based on the received feedback, the account usage model is adjusted using machine learning. In some examples, the success or failure of the retry attempt, based on the merchant feedback, is used to tune, optimize, or otherwise adjust model rules of the account usage model such that the accuracy of future calculations of confidence factors is improved, as described herein.

Additional Example Scenarios

Aspects of the disclosure enable various additional scenarios, such as next described.

In an example, a user initiates a recurring transaction with a merchant using a payment account. The recurring transaction is configured to occur on the 7th day of each month. For the first two months, the recurring transaction is successfully completed.

In the third month, the recurring transaction instance fails due to the payment account having insufficient funds. The failure of the transaction is indicated to the merchant. The merchant contacts that payment network that facilitates the recurring transaction via an API of an account monitor module of the payment network. The merchant sends information to the account monitor module that includes an indication of the failed transaction and the associated payment account, including an account identifier of the account.

The account monitor module receives the account identifier stores it in a monitored account identifier data set in association with an identifier of the merchant and the specific transaction. The account monitor module is configured to continuously monitor transaction data associated with transactions with which the payment account is involved.

Two days later, a transaction involving the payment network and another merchant is successfully completed. The account monitor module detects the completed transaction based on monitoring the transaction stream through the payment network and matching the account identifier on the detected transaction to the stored account identifier. Based on detecting the successful transaction, the account monitor module generates a transaction retry notification and sends it to the merchant based on the stored identifier of the merchant.

Upon receiving the transaction retry notification, the merchant initiates a transaction retry of the failed transaction on the payment account. Because the payment account now has sufficient funds for the transaction, the transaction retry is successful.

In a related example, when generating the transaction retry notification, the account monitor module accesses historical transaction data of the payment account and generates an account usage pattern based thereon. The account usage pattern is used to calculate a confidence factor of 85%, indicating that the success of a transaction retry at the current time has an 85% chance of being successful. The confidence factor is included in the transaction retry notification when it is sent to the merchant.

Exemplary Operating Environment

Figure 5:
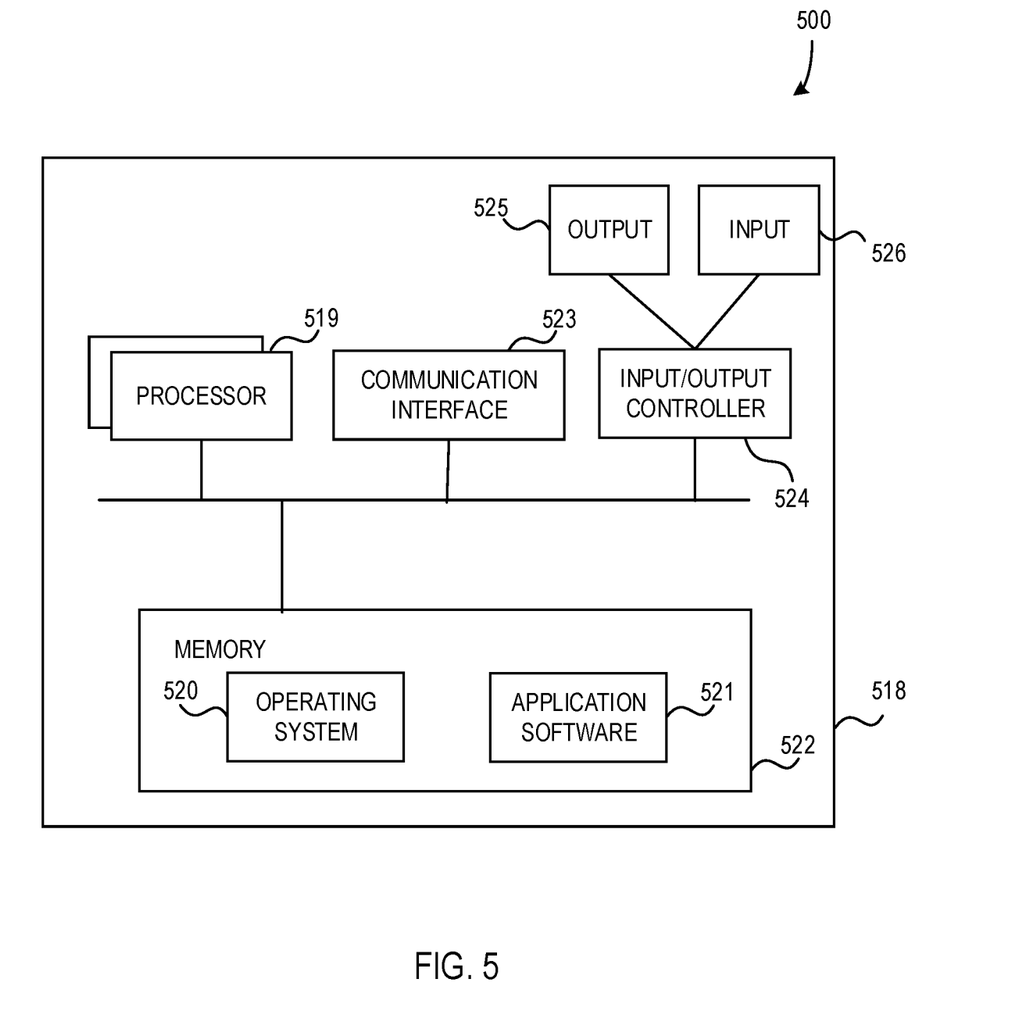
FIG. 5 illustrates a computing apparatus according to an embodiment as a functional block diagram.

The present disclosure is operable with a computing apparatus according to an embodiment as a functional block diagram 500 in FIG. 5. In an embodiment, components of a computing apparatus 518 may be implemented as a part of an electronic device according to one or more embodiments described in this specification. The computing apparatus 518 comprises one or more processors 519 which may be microprocessors, controllers or any other suitable type of processors for processing computer executable instructions to control the operation of the electronic device. Alternatively, or in addition, the processor 519 is any technology capable of executing logic or instructions, such as a hard-coded machine. Platform software comprising an operating system 520 or any other suitable platform software may be provided on the apparatus 518 to enable application software 521 to be executed on the device. According to an embodiment, providing transaction retry notifications to merchants based on monitored account usage as described herein may be accomplished by software, hardware, and/or firmware.

Computer executable instructions may be provided using any computer-readable media that are accessible by the computing apparatus 518. Computer-readable media may include, for example, computer storage media such as a memory 522 and communications media. Computer storage media, such as a memory 522, include volatile and non-volatile, removable and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that the storage may be distributed or located remotely and accessed via a network or other communication link (e.g. using a communication interface 523).

The computing apparatus 518 may comprise an input/output controller 524 configured to output information to one or more output devices 525, for example a display or a speaker, which may be separate from or integral to the electronic device. The input/output controller 524 may also be configured to receive and process an input from one or more input devices 526, for example, a keyboard, a microphone or a touchpad. In one embodiment, the output device 525 may also act as the input device. An example of such a device may be a touch sensitive display. The input/output controller 524 may also output data to devices other than the output device, e.g. a locally connected printing device. In some embodiments, a user may provide input to the input device(s) 526 and/or receive output from the output device(s) 525.

The functionality described herein can be performed, at least in part, by one or more hardware logic components. According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system for providing transaction retry notifications comprises: at least one processor; and at least one memory comprising computer program code, the at least one memory and the computer program code configured to, with the at least one processor, cause the at least one processor to: receive an insufficient funds message of a first transaction, wherein the insufficient funds message indicates that the first transaction includes a payment to be provided to a merchant from an account and that the account has insufficient funds to provide the payment to the merchant; store an account identifier of the account associated with the first transaction in a monitored account identifier data set; detect a transaction message of a second transaction associated with the account based on the stored account identifier in the monitored account identifier data set, wherein the transaction message indicates that the account has sufficient funds for the second transaction; and based on detecting the transaction message, send a transaction retry notification to the merchant, wherein the merchant is configured to retry the first transaction based on receiving the retry notification.

A computerized method for providing transaction retry notifications comprises: receiving, by a processor, an insufficient funds message of a first transaction, wherein the insufficient funds message indicates that the first transaction includes a payment to be provided to a merchant from an account and that the account has insufficient funds to provide the payment to the merchant; storing, by the processor, an account identifier of the account associated with the first transaction in a monitored account identifier data set; detecting, by the processor, a transaction message of a second transaction associated with the account based on the stored account identifier in the monitored account identifier data set, wherein the transaction message indicates that the account has sufficient funds for the second transaction; and based on detecting the transaction message, sending, by the processor, a transaction retry notification to the merchant, whereby the merchant is notified to retry the first transaction.

One or more non-transitory computer storage media having computer-executable instructions for providing transaction retry notifications, upon execution by a processor, cause the processor to at least: receive an insufficient funds message of a first transaction, wherein the insufficient funds message indicates that the first transaction includes a payment to be provided to a merchant from an account and that the account has insufficient funds to provide the payment to the merchant; store an account identifier of the account associated with the first transaction in a monitored account identifier data set; generate an account usage pattern of the account based on historical transaction data associated with the account, wherein the account usage pattern indicates at least a pattern of failed transactions and successful transactions of the account; detect a transaction message of a second transaction associated with the account based on the stored account identifier in the monitored account identifier data set, wherein the transaction message indicates that the account has sufficient funds for the second transaction; based on detecting the transaction message, determine a confidence factor based on the generated account usage pattern, wherein the confidence factor indicates a likelihood that a transaction retry will be successful; generate a transaction retry notification that includes the determined confidence factor; and based on generating the transaction retry notification, send the transaction retry notification to the merchant, whereby the merchant is notified to retry the first transaction.

Alternatively, or in addition to the other examples described herein, examples include any combination of the following:

further comprising: generating, by the processor, an account usage pattern of the account based on historical transaction data associated with the account, wherein the account usage pattern indicates at least a pattern of failed transactions and successful transactions of the account; and determining, by the processor, a confidence factor based on the generated account usage pattern, wherein the confidence factor indicates a likelihood that a transaction retry will be successful; and wherein sending the transaction retry notification further includes adding the determined confidence factor to the transaction retry notification such that the confidence factor is included in the transaction retry notification and sent to the merchant.
wherein determining the confidence factor further includes: applying at least one model rule of an account usage model to the account usage pattern, wherein the at least one model rule is configured to generate at least one rule output value based on at least a portion of the account usage pattern; and based on the generated at least one rule output value, determining the confidence factor.
further comprising: based on sending the transaction retry notification, receiving, by the processor, merchant feedback, wherein the merchant feedback includes at least one of an indication that a transaction retry based on the transaction retry notification was successful or an indication that a transaction retry based on the transaction retry notification failed; and adjusting, by the processor, at least one model rule of the account usage model based on the merchant feedback using machine learning, whereby the account usage model is trained using machine learning.
wherein determining the confidence factor further includes determining a plurality of confidence factors, wherein each confidence factor of the plurality of confidence factors indicates a likelihood that a transaction retry will be successful on an associated date; and wherein sending the transaction retry notification further includes adding the plurality of confidence factors in a transaction schedule recommendation to the transaction retry notification such that the transaction schedule recommendation is included in the transaction retry notification and sent to the merchant.
wherein sending the transaction retry notification to the merchant is based on the determined confidence factor exceeding a defined confidence threshold.
wherein the first transaction is a recurring transaction and the transaction retry notification includes a proposed recurring payment schedule based on the account usage pattern, wherein the proposed recurring payment schedule is configured to reduce a likelihood of future instances of the recurring transaction failing due to insufficient funds.
further comprising receiving, by the merchant, the transaction retry notification; and based on receiving the transaction retry notification, initiating, by the merchant, a retry attempt of the first transaction.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for receiving, by a processor, an insufficient funds message of a first transaction, wherein the insufficient funds message indicates that the first transaction includes a payment to be provided to a merchant from an account and that the account has insufficient funds to provide the payment to the merchant; exemplary means for storing, by the processor, an account identifier of the account associated with the first transaction in a monitored account identifier data set; exemplary means for detecting, by the processor, a transaction message of a second transaction associated with the account based on the stored account identifier in the monitored account identifier data set, wherein the transaction message indicates that the account has sufficient funds for the second transaction; and based on detecting the transaction message, exemplary means for sending, by the processor, a transaction retry notification to the merchant, whereby the merchant is notified that the account with which the first transaction is associated includes a quantity of funds.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for providing transaction retry notifications, the system comprising:
   at least one processor; and
   at least one memory storing computer program code that when executed by the at least one processor causes the at least one processor to perform operations of:
   receiving an insufficient funds message of a first transaction, wherein the insufficient funds message indicates that the first transaction includes a payment to be provided to a merchant from an account and that the account has insufficient funds to provide the payment to the merchant;
   storing an account identifier of the account associated with the first transaction in a monitored account identifier data set;
   detecting a successful transaction message of a second transaction associated with the account based on the stored account identifier in the monitored account identifier data set, the second transaction being initiated after the first transaction;
   upon detecting the successful transaction message, calculating a confidence factor of a retry attempt of the first transaction, wherein the confidence factor indicates a likelihood that the retry attempt will be successful;
   based on the calculated confidence factor exceeding a confidence threshold, sending a transaction retry notification to the merchant;
   receiving a retry of the first transaction from the merchant after sending the transaction retry notification; and
   training, using a machine learning module comprising a trained regressor that is trained based on merchant feedback indicating whether the retry was successful, an account usage model.

2. The system of claim 1, wherein the computer program code when executed by the at least one processor further causes the at least one processor to perform operations of:
   generating an account usage pattern of the account based on historical transaction data associated with the account, wherein the account usage pattern indicates at least a pattern of failed transactions and successful transactions of the account; and
   wherein sending the transaction retry notification further includes the calculated confidence factor to the transaction retry notification sent to the merchant.

3. The system of claim 2, wherein calculating the confidence factor further includes:
   applying at least one model rule of the account usage model to the account usage pattern, wherein the at least one model rule generates at least one rule output value based on at least a portion of the account usage pattern; and
   based on the generated at least one rule output value, calculating the confidence factor.

4. The system of claim 3, wherein the computer program code when executed by the at least one processor further causes the at least one processor to perform operations of:
   adjusting the at least one model rule of the account usage model based on the merchant feedback using machine learning, the account usage model being trained using machine learning.

5. The system of claim 1, wherein calculating the confidence factor further includes calculating a plurality of confidence factors, wherein each confidence factor of the plurality of confidence factors indicates a likelihood that the retry attempt will be successful on an associated date; and
   wherein sending the transaction retry notification further includes including the plurality of confidence factors in a transaction schedule recommendation to the transaction retry notification sent to the merchant.

6. The system of claim 1, wherein the computer program code when executed by the at least one processor further causes the at least one processor to perform operations of:
   after the training is complete, generating, by applying the account usage model to an account usage pattern, one or more of: confidence factors and a transaction schedule recommendation that predicts results of transaction retry attempts in the future.

7. The system of claim 2, wherein the first transaction is a recurring transaction and the transaction retry notification includes a proposed recurring payment schedule based on the account usage pattern, the proposed recurring payment schedule reducing a likelihood of future instances of the recurring transaction failing due to insufficient funds.

8. A computerized method for providing transaction retry notifications, the method comprising:
   receiving, by a processor, an insufficient funds message of a first transaction, wherein the insufficient funds message indicates that the first transaction includes a payment to be provided to a merchant from an account and that the account has insufficient funds to provide the payment to the merchant;
   storing, by the processor, an account identifier of the account associated with the first transaction in a monitored account identifier data set;
   detecting, by the processor, a successful transaction message of a second transaction associated with the account based on the stored account identifier in the monitored account identifier data set, the second transaction being initiated after the first transaction;
   upon detecting the successful transaction message, calculating a confidence factor of a retry attempt of the first transaction, wherein the confidence factor indicates a likelihood that the retry attempt will be successful;
   determining that the calculated confidence factor exceeds a confidence threshold;
   upon determining that the calculated confidence factor exceeds the confidence threshold, sending, by the processor, a transaction retry notification to the merchant;
   receiving a retry of the first transaction from the merchant after sending the transaction retry notification; and
   training, using a machine learning module comprising a trained regressor that is trained based on merchant feedback indicating whether the retry was successful, an account usage model.

9. The computerized method of claim 8, the method further comprising:
   generating, by the processor, an account usage pattern of the account based on historical transaction data associated with the account, wherein the account usage pattern indicates at least a pattern of failed transactions and successful transactions of the account; and
   wherein sending the transaction retry notification further includes the calculated confidence factor to the transaction retry notification sent to the merchant.

10. The computerized method of claim 9, wherein calculating the confidence factor further includes:
    applying at least one model rule of the account usage model to the account usage pattern, wherein the at least one model rule generates at least one rule output value based on at least a portion of the account usage pattern; and based on the generated at least one rule output value, calculating the confidence factor.

11. The computerized method of claim 10, the method further comprising:

adjusting, by the processor, the at least one model rule of the account usage model based on the merchant feedback using machine learning, the account usage model being trained using machine learning.

12. The computerized method of claim 8, wherein calculating the confidence factor further includes calculating a plurality of confidence factors, wherein each confidence factor of the plurality of confidence factors indicates a likelihood that the retry attempt will be successful on an associated date; and wherein sending the transaction retry notification further includes the plurality of confidence factors in a transaction schedule recommendation to the transaction retry notification sent to the merchant.

13. The computerized method of claim 8, further comprising:

after the training is complete, generating, by applying the account usage model to an account usage pattern, one or more of: confidence factors and a transaction schedule recommendation that predicts results of transaction retry attempts in the future.

14. The computerized method of claim 9, wherein the insufficient funds message is received via an incoming transaction stream, wherein detecting the successful transaction message of the second transaction associated with the account based on the stored account identifier in the monitored account identifier data set comprises:

monitoring the incoming transaction stream for transactions associated with the stored account identifier; and detecting the successful transaction message of the second transaction in the monitored incoming transaction stream.

15. The computerized method of claim 8, the method further comprising evaluating a length of time since receiving the insufficient funds message of the first transaction and evaluating transaction data from a number of past months to calculate the confidence factor.

16. One or more non-transitory computer storage media storing computer-executable instructions for providing transaction retry notifications that, upon execution by a processor, cause the processor to perform operations of:

receiving an insufficient funds message of a first transaction, wherein the insufficient funds message indicates that the first transaction includes a payment to be provided to a merchant from an account and that the account has insufficient funds to provide the payment to the merchant;

storing an account identifier of the account associated with the first transaction in a monitored account identifier data set;

generating an account usage pattern of the account based on historical transaction data associated with the account, wherein the account usage pattern indicates at least a pattern of failed transactions and successful transactions of the account;

detecting a successful transaction message of a second transaction associated with the account based on the stored account identifier in the monitored account identifier data set;

based on detecting the successful transaction message, determining a confidence factor based on the generated account usage pattern, wherein the confidence factor indicates a likelihood that a transaction retry of the first transaction will be successful;

based on the determined confidence factor exceeding a confidence threshold, generating a transaction retry notification that includes the determined confidence factor;

sending the generated transaction retry notification to the merchant;

receiving a retry of the first transaction from the merchant after sending the generated transaction retry notification; and training, using a machine learning module comprising a trained regressor that is trained based on merchant feedback indicating whether the retry was successful, an account usage model.

17. The one or more non-transitory computer storage media of claim 16, wherein determining the confidence factor further includes:

applying at least one model rule of the account usage model to the account usage pattern, wherein the at least one model rule generates at least one rule output value based on at least a portion of the account usage pattern; and based on the generated at least one rule output value, determining the confidence factor.

18. The one or more non-transitory computer storage media of claim 17, wherein the computer-executable instructions, upon execution by the processor, further cause the processor to perform operations of:

adjusting the at least one model rule of the account usage model based on the merchant feedback using machine learning, the account usage model being trained using machine learning.

19. The one or more non-transitory computer storage media of claim 16, wherein determining the confidence factor further includes determining a plurality of confidence factors, wherein each confidence factor of the plurality of confidence factors indicates a likelihood that the transaction retry will be successful on an associated date; and wherein sending the transaction retry notification further includes the plurality of confidence factors in a transaction schedule recommendation to the transaction retry notification sent to the merchant.

20. The one or more non-transitory computer storage media of claim 16, wherein the computer-executable instructions, upon execution by the processor, further cause the processor to perform operations of providing an application programming interface (API), wherein the API is subscribed by the merchant to receive the transaction retry notification.

* * * * *